Figure 1:
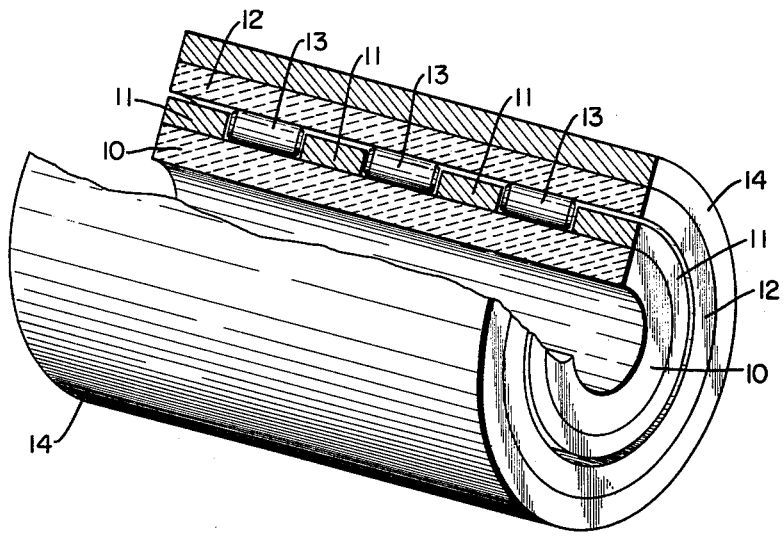

April 13, 1965  M. V. BRAUNAGEL  3,178,241

LUBRICATIONLESS HIGH-TEMPERATURE BEARING

Filed March 18, 1963

INVENTOR.
MAGNUS V. BRAUNAGEL
BY
ATTORNEY

United States Patent Office 3,178,241
Patented Apr. 13, 1965

3,178,241
LUBRICATIONLESS HIGH-TEMPERATURE BEARING
Magnus V. Braunagel, Littleton, Colo., assignor, by mesne assignments, to Space Technology and Research Corporation, Denver, Colo., a corporation of Colorado
Filed Mar. 18, 1963, Ser. No. 269,228
4 Claims. (Cl. 308—177)

This invention relates to a bearing, and more particularly to a bearing capable of withstanding heavy loads at high temperatures without the necessity of being lubricated.

Lubricationless bearings are known in the art. However, such bearings tend to wear unduly, overheat excessively and even seize. This is especially the case when the bearing is heavily loaded. Also, under heavy loading conditions, the bearing sometimes is permanently damaged by compression of the heated material of which the bearing is constructed.

Lubricationless bearings are called upon to operate while immersed in water, acids, or other liquids or vapors. In such cases the structure and materials of construction of the bearing are of paramount importance. Furthermore, in some cases lubricationless bearings are required to operate with a large electrical potential difference between an input shaft and the bearing housing. In nuclear energy equipment, lubricationless bearings must be able to endure long periods of exposure to intense radiation levels.

Accordingly, it is an important object of this invention to provide a lubricationless bearing which is capable of bearing heavy loads without undue wear, seizing or other injury thereto.

Another object of this invention is to provide a bearing which, under heavy loading, will not suffer permanent damage due to compression of the material of which the bearing is constructed.

A further object of this invention is to provide a bearing which will operate satisfactorily for prolonged periods of heavy duty operation while immersed in water, acids or other liquids or vapors.

A still further object of this invention is to provide a bearing which can be used to operate without difficulty while a large electrical potential difference is impressed between an input shaft and the bearing housing.

An additional object of this invention is to provide a lubricationless bearing which is capable of long periods of trouble-free operation while exposed to intense radiation levels.

Additional objects and advantages of the invention will become apparent from the following description, which is given primarily for purposes of illustration, and not limitation.

Stated in general terms, the objects of this invention are attained by providing a bearing which comprises an inner race made of ceramic material, preferably maintained under compression, such as by compressive metal rings mounted around it. An outer race also made of ceramic material, is mounted, in spaced relationship, around the inner race. The outer race preferably also is maintained under compression, such as by a compressive outer metal jacket mounted around it. A plurality of bearing members such as roller bearings, or ball bearings for example, which may be made of ceramic material are disposed in the space, or spaces, between the inner and outer races, and any compressive rings, in anti-friction relationship to the races.

Figure 2:
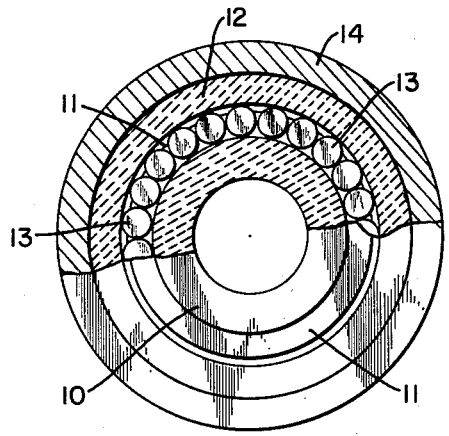

A more detailed description of a specific embodiment of the invention is given below with reference to the accompanying drawing, wherein:

FIG. 1 is an isometric view, with a portion cut away, of a bearing assembly showing the bearing members, inner and outer races, inner race compressive rings and outer jacket; and FIG. 2 is an end view, partially in cross-section, of the bearing assembly of FIG. 1, showing the disposition of the bearing members.

The inner race 10 of the specific embodiment shown in the drawing, is made of a cylinder of alumina ceramic sold by the Coors Porcelain Company of Denver, Colorado, under the designation "AD-99". The inside diameter of inner race 10 is 1.000±0.002 inch and, when in use, is fitted tightly upon a drive shaft or journal in conventional manner. The outside diameter of inner race 10, in this specific embodiment, is 2.000+0.0000−0.0005 inches and the length is 3.5000±0.005 inches.

Four inner race steel compressive rings or bands 11 are shown in FIG. 1 mounted around inner race 10 spaced 0.500+0.001−0.000 inch from each other. The inside diameter of each compressive ring 11 is 1.996+0.001−0.0005 inches, the outside diameter is 2.470±0.001 inches and the width is 0.5000+0.000−0.001 inch.

It will be noted that the outside diameter of inner race 10 is slightly larger than the inside diameter of inner race compressive rings 11, by about 0.003 inch in this specific embodiment. This differential is designed to produce and maintain the desired compression of the inner race 10 by inner race compressive rings 11.

Inner race compressive rings 11 are mounted around inner race 10 by cooling inner race 10 and heating inner race compressive rings 11 to establish a predetermined temperature differential therebetween. In this manner inner race 10 will contract because of its temperature coefficient of contraction and inner race compressive rings 11 will expand because of their temperature coefficient of expansion to somewhat more than offset the 0.003 inch diameter differential. After the heated inner race compressive rings 11 are positioned around cooled inner race 10, and the resulting assembly is permited to come to equilibrium temperature with the atmosphere, a desired, predetermined compression of inner race 10 is established and maintained by the built-in 0.003 inch diameter differential.

Outer race 12 also is made of a cylinder of alumina ceramic designated AD-99. The inside diameter of outer race 12 is 2.4772+0.001−0.000 inches, the outside diameter is 3.000+0.000−0.001 inches and the length is the same as that of inner race 10, that is, 3.5000±0.005 inches. Thus the inside diameter of outer race 12 is about 0.007 inch greater than the outside diameter of inner race compressive rings 11. As outer race 12 is progressively slipped over and around the inner race assembly of inner race 10 and inner race compressive rings 11, roller bearing members 13 are mounted in the three annular spaces between adjacent pairs of inner race compressive rings 11, as shown in the drawing.

Roller bearing members 13 also are made of AD-99 alumina ceramic. Each roller 13 is 0.2386+0.0000−0.0002 inch in diameter and 0.500+0.000−0.001 inch long. The ends of rollers 13 are annularly beveled, as shown in FIG. 1. Each of the three annular spaces between adjacent pairs of inner race compressive rings 11 is provided with 25 rollers 13, 75 rollers in all.

Steel outer jacket 14 is mounted around outer race 12 in compressive relationship to the outer race in a manner similar to the compressive relationship of inner race compressive rings 11 to inner race 10. The inside diameter of outer jacket 14 is 2.9950+0.000−0.001 inches, the outside diameter is 3.500+0.005−0.001 inches and the length is the same as that of inner race 10 and outer race 12, that is, 3.5000+0.005 inches. Thus the inside diameter of outer jacket 14 is about 0.005 inch smaller than the outside diameter of outer race 12. Thus diameter differential is designed to produce and maintain the desired compression of the outer race 12.

Steel outer jacket 14 is mounted around ceramic outer race 12 by sufficiently cooling the outer race and sufficiently heating the outer jacket to over-compensate for the 0.005 inch diameter differential so that the outer jacket can be fitted around the outer race. Upon permitting the resulting assembly to come to equilibrium temperature with the atmosphere, the desired, predetermined compression of outer race 12 by outer jacket 14 is established and maintained by the built-in 0.005 inch diameter differential.

The resulting lubricationless high-temperature bearing assembly can be additionally housed, if desired, and mounted in conventional manner depending upon the particular use to which it is applied. In the specific embodiment of the invention described hereinabove with reference to the drawing, wherein inner race 10, outer race 12 and rollers 13 are made of ceramic, and wherein the inner race and the outer race are maintained under controlled compression by inner race steel compressive rings 11 and steel outer jacket 14, respectively, a lubricationless high-temperature bearing has resulted which can be operated under high loading for prolonged periods of time without undue wear, excessive overheating, seizure or damage due to compression of the rollers or races.

The steels or other suitable metals employed in the inner race compressive rings and the outer compressive jacket preferably are high-temperature steels or chemically resistant steels permitting the bearing to operate at about 1000° F., or higher. Extremely low temperatures have no substantial effect on the operating characteristics or life of the bearing of this invention. Selection of the proper steel permits the bearing of this invention to be operated while immersed in water, acids, other liquids or vapors. It will be understood that any suitable ceramic material can be used to make the inner and outer races and the roller or ball bearing members. Such ceramic surfaces in pressure contact do not seize and are highly resistant to wear. In the bearing of this invention, only such ceramic surfaces are in frictional or pressure contact.

Furthermore, the drive shaft or journal positioned or disposed in the ceramic inner race, which in turn is surrounded by the ceramic outer race, is electrically insulated from the steel outer jacket or other housing by the ceramic races so that the bearing of this invention can operate with a large electrical potential difference between the drive shaft or journal and the housing. In addition, the bearing can endure long periods of intense radiation levels such as are encountered in nuclear energy equipment because none of its parts are appreciably effected by nuclear radiation. Thus the bearing of this invention can be used in space vehicles, cryogenic equipment, gas turbines, nuclear controls, submerged pumps and motors, high temperature furnace equipment, boat drive shafts, chemical equipment and like equipment.

Although a specific embodiment of the bearing of this invention was described and illustrated as employing cylindrical roller bearing members, it will be understood that ball bearing members, conical bearing members, disc bearing members, or other suitably shaped bearing members also are contemplated as being used in the bearing of this invention. Furthermore, although cylindrical ceramic inner and outer races have been described and illustrated hereinabove, it will be understood that ring-shaped races for radial ball bearings, employing point contact features, thrust bearings, hub bearings, and, roller bearings as well as combination roller and friction bearings, in general are contemplated as being useful in the bearing of this invention.

Obviously, many other modifications and variations of the lubricationless high-temperature bearing of the present invention are possible in the light of the teachings given hereinabove. It is, therefore, to be understood that, within the scope of the appended claims, the invention can be practiced otherwise than as specifically described or illustrated hereinabove.

What is claimed is:

1. A bearing comprising an inner race of ceramic, a plurality of spaced compressive rings of metal mounted around the inner race in compressive relationship thereto, an outer race of ceramic disposed in spaced relationship around the inner race, and a plurality of ceramic bearing members disposed in the spaces between the inner and outer races and the compressive rings in anti-friction relationship to the races.

2. A bearing comprising an inner race of ceramic, a plurality of spaced compressive rings of metal mounted around the inner race in compressive relationship thereto, an outer race of ceramic disposed in spaced relationship around the inner race, a plurality of ceramic bearing members disposed in the spaces between the inner and outer races and the compressive rings in anti-friction relationship to the races, and an outer jacket of metal mounted snugly around the outer race in compressive relationship thereto.

3. A bearing comprising an inner race of alumina ceramic, a plurality of spaced compressive rings of steel mounted around the inner race in compressive relationship thereto, an outer race of alumina ceramic disposed in spaced relationship around the inner race, a plurality of alumina ceramic roller bearing members disposed in the spaces between the inner and outer races and the compressive rings in anti-friction relationship to the races, and an outer jacket of steel mounted snugly around the outer race in compressive relationship thereto.

4. A bearing comprising a generally cylindrical inner race of alumina ceramic, a plurality of spaced compressive rings of steel mounted around the inner race in compressive relationship thereto, a generally cylindrical outer race of alumina ceramic disposed in spaced relationship around the inner race, a plurality of alumina ceramic roller bearing members disposed in the spaces between the inner and outer races and the compressive rings in anti-friction relationship to the races, and a generally cylindrical outer jacket of steel mounted snugly around the outer race in compressive relationship thereto.

References Cited by the Examiner

UNITED STATES PATENTS

| | | | |
|---|---|---|---|
| 1,200,445 | 10/16 | Laycock | 308—213 |
| 2,062,041 | 11/36 | Robinson | 308—207 |
| 2,074,182 | 3/37 | Heim | 308—212 |
| 2,074,202 | 3/37 | Benedek | 308—215 XR |
| 2,158,156 | 5/39 | Schroder | 308—188 |
| 2,208,724 | 7/40 | Griswold | 308—174 |
| 2,534,929 | 12/50 | Schultz | 308—188 |

ROBERT C. RIORDON, *Primary Examiner.*